United States Patent
Fuld et al.

(10) Patent No.: US 6,883,049 B1
(45) Date of Patent: Apr. 19, 2005

(54) METHOD AND SYSTEM FOR MAKING AN OPEN SYSTEM VOLUME ACCESSIBLE TO AN MVS SYSTEM

(75) Inventors: Stephen Fuld, Boulder, CO (US); William Grant Lomelino, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,762

(22) Filed: Dec. 16, 1999

(51) Int. Cl.[7] ............................................. G06F 13/12
(52) U.S. Cl. ...................... 710/74; 710/65; 711/100; 711/111; 711/112
(58) Field of Search ............................. 710/65, 72, 74; 711/100, 111, 112

(56) References Cited

U.S. PATENT DOCUMENTS

| | | | |
|---|---|---|---|
| 4,993,030 A | | 2/1991 | Krakauer et al. ............... 714/6 |
| 5,485,579 A | | 1/1996 | Hitz et al. ................... 709/221 |
| 5,640,541 A | | 6/1997 | Bartram et al. ............... 703/26 |
| 5,909,692 A | | 6/1999 | Yanai et al. ................... 711/4 |
| 6,112,277 A | * | 8/2000 | Bui et al. .................... 711/114 |
| 6,141,731 A | * | 10/2000 | Beardsley et al. .......... 711/136 |
| 6,219,751 B1 | * | 4/2001 | Hodges ...................... 711/114 |
| 6,304,940 B1 | * | 10/2001 | Beardsley .................... 711/112 |
| 6,449,697 B1 | * | 9/2002 | Beardsley et al. .......... 711/137 |

* cited by examiner

*Primary Examiner*—Jeffrey Gaffin
*Assistant Examiner*—Alan S Chen
(74) *Attorney, Agent, or Firm*—Randall J. Bluestone; Harrington & Smith, LLP

(57) ABSTRACT

A method is provided for enabling a computer that processes data formatted in a first format to read a data unit that is formatted in a second format from a storage subsystem that is capable of storing data in either the first format or the second format. The method comprises the steps of dispatching, from the computer to the storage subsystem, a command for the storage subsystem to report a data length of the data unit; sending, from the storage subsystem to the computer, a value of the data length that enables the computer to determine whether the data unit is in the first format or in the second format and prepare for receipt of the data unit in the first format or the second format, having the indicated data length; dispatching, from the computer to the storage subsystem, a command for the storage subsystem to forward the data unit to the computer; and sending the data unit from the storage subsystem to the computer.

26 Claims, 2 Drawing Sheets

METHOD AND SYSTEM FOR MAKING AN OPEN SYSTEM VOLUME ACCESSIBLE TO AN MVS SYSTEM

FIELD OF THE INVENTION

The present invention relates to an enterprise storage system and, more particularly, to an enterprise storage system in which a computer that processes data formatted in a first format is enabled to read data formatted in a second format from a storage subsystem that is capable of storing data in either the first format or the second format.

BACKGROUND OF THE INVENTION

Many organizations store information in an enterprise storage system that includes some components that utilize an open system architecture and other components that utilize a multiple virtual storage (MVS) system architecture. An organization having such a system must be able to move information between components of the two different architectures.

U.S. Pat. No. 5,640,541 to Bartram at al., entitled "Adapter For Interfacing A SCSI Bus With An IBM System/360/370 I/O Interface Channel And Information System Including Same", describes an adapter for interfacing two different architectures. The adapter is coupled to, and allows bi-directional communication between, a Small Computer Standard Interface (SCSI) bus and a System/360/370 I/O Interface Channel.

However, an enterprise storage system can include a data storage subsystem capable of interfacing with both an open system processor and an MVS processor. Such a data storage subsystem permits the open system processor to write and read data in an open system format, and it permits the MVS processor to write and read data in an MVS format.

A system that includes a data storage subsystem capable of interfacing with both an open system processor and an MVS processor would benefit from an arrangement where the MVS processor is enabled to read data that is stored in the data storage subsystem in the open system format. An organization could thereby apply MVS procedures to backup and restore the open system data, and thus consolidate the backup of open system data volumes into existing backup processes for MVS data volumes.

Accordingly, it is an object of the present invention to provide a system in which an MVS processor can read open system data from a data storage device.

It is another object of the present invention to provide such a system in which the open system data is backed up through the MVS processor in accordance with an MVS backup procedure.

SUMMARY OF THE INVENTION

In accordance with the present invention, a method is provided for enabling a computer that processes data formatted in a first format to read a data unit that is formatted in a second format from a storage subsystem that is capable of storing data in either the first format or the second format. The method comprises the steps of dispatching, from the computer to the storage subsystem, a command for the storage subsystem to report a data length of the data unit; sending, from the storage subsystem to the computer, a value of the data length that enables the computer to determine whether the data unit is in the first format or in the second format and prepare for receipt of the data unit, in the first format or the second format, having the indicated data length; dispatching, from the computer to the storage subsystem, a command for the storage subsystem to forward the data unit to the computer; and sending the data unit from the storage subsystem to the computer.

In accordance with one embodiment of the present invention, a system is provided in which a computer that processes data formatted in a first format is enabled to read data formatted in a second format from a storage subsystem that is capable of storing data in either the first format or the second format. The computer dispatches a command for the storage subsystem to report a data length of the data unit; determines whether the data unit is in the first format or the second format and prepares for receipt of the data unit, in the first format or the second format, based on the data length; and dispatches a command for the storage subsystem to forward the data unit to the computer. The storage subsystem sends a value of the data length to the computer and sends the data unit to the computer.

DETAILED DESCRIPTION OF THE INVENTION

Figure 1:
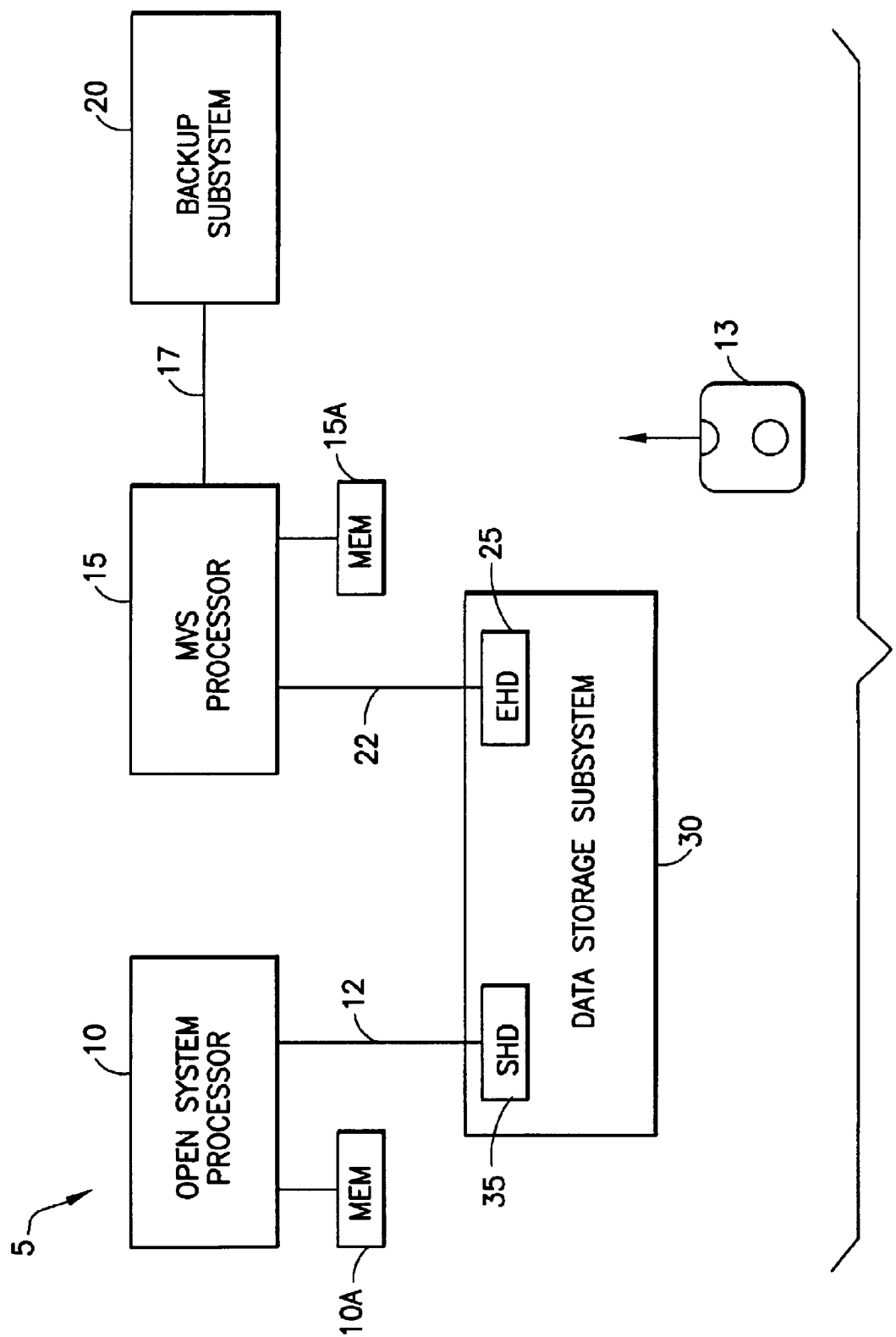
FIG. 1 is a block diagram of an enterprise storage network particularly suited for employment of the present invention.

FIG. 1 is a block diagram of an enterprise storage network 5 particularly suited for employment of the present invention. Network 5 is a system in which a computer that processes data formatted in a first format is enabled to read data formatted in a second format from a storage subsystem that is capable of storing data in either the first format or the second format. For the purpose of illustration herein, the first format is CKD and the second format is SCSI. The system includes an open system processor 10, an MVS processor 15, a data storage subsystem 30 and a backup subsystem 20.

Open system processor 10 is coupled to data storage subsystem 30 via a bus 12, and MVS processor 15 is coupled to data subsystem 30 via a bus 22. Backup subsystem 20 is coupled to MVS processor 15 via a bus 17.

Open system processor 10 can be any computer workstation or personal computer, including but not limited to a UNIX®-based, DOS or Windows™ system, that communicates with other components according to the Small Computer Standard Interface (SCSI) standard. As an example, a Solaris™ workstation, available from Sun Microsystems, Inc. of Palo Alto, Calif. can serve in this capacity.

Data stored in accordance with the SCSI standard is organized into fixed-size blocks, and a predetermined number of blocks are organized into a logical unit (LUN). In an open system, one read or write command can transfer a complete LUN of data between a processor and a data storage device.

MVS processor 15, typically a mainframe computer such as a System 390 available from IBM Corporation of Armonk, N. Y., communicates with other components in accordance with the Enterprise System Connection (ESCON) protocol. It includes an associated memory 15a for storing data and program instructions. When transferring data from or to a storage device, MVS processor 15 requires data to be organized in the Count, Key and Data (CKD) format.

Data stored in accordance with the CKD format is organized into records that are located in tracks. A predetermined number of tracks are further organized into an MVS logical device. A CKD track has a variable usable data length, and it commences with a header, which includes a home address field, a record 0 field, and a count field that indicates the usable data length.

Data storage subsystem 30 is a data storage device, such as a Ramac Scalable Array-3 (RSA-3) available from IBM Corporation, Armonk, N. Y., that is capable of storing data in the SCSI format and also capable of storing data in the CKD format. Data storage subsystem 30 includes a SCSI host director (SHD) 35, with which it exchanges SCSI formatted data with open system processor 10, and an ESCON host director (EHD) 25, with which it exchanges CKD formatted data with MVS processor 15.

Backup subsystem 20 is a conventional storage subsystem, typically a disk or tape system, used for backing up data. MVS processor 15 executes an MVS backup procedure in which it copies data from data storage subsystem 30 and writes the data to backup subsystem 20.

Within data storage subsystem 30, both SCSI data and MVS data is organized into MVS logical devices. Each MVS logical device has a Volume Label (VOLID) and a Volume Table of Contents (VTOC) in accordance with an MVS storage protocol. The VOLID resides at a logical cylinder 0, head 0 of data storage subsystem 30, and the VTOC resides at cylinder 0, heads 1–14.

When data storage subsystem 30 stores a SCSI LUN from open system processor 10, SHD 35 maps the SCSI LUN on top of one or more MVS logical devices. In order for the mapped data to conform to the MVS storage protocol, SHD 35 bypasses cylinder 0 when writing SCSI data to data storage subsystem 30. More particularly, when SHD 35 maps a SCSI block to an MVS track, SHD 35 starts writing SCSI block 0 to MVS cylinder 1, head 0, and then progresses to subsequent tracks on the logical device.

SCSI data does not include a home address field, a record 0 field, and a count field as required by the CKD format. Accordingly, when SCSI data is written to a track within data storage subsystem 30, the quantity of usable data written to the track is greater than that which can be written under the CKD standard. That is, the usable data length of a track containing SCSI data is greater than the usable data length of the track if it contained CKD data.

When MVS processor 15 wishes to read a data unit, e.g., a track of data, from a logical device within data storage subsystem 30, MVS processor 15 first determines whether the logical device is a normal MVS logical device or whether it is assigned as part of a SCSI LUN. MVS processor 15 distinguishes between an MVS logical device and a SCSI LUN based on the usable data length of the track of data.

MVS processor 15 dispatches a Read Device Characteristic Command, which is a command for data storage subsystem 30 to report an identifier of a family of storage subsystems of which data storage subsystem 30 is a member, and the usable data length of the track. In response, data storage subsystem 30 sends to MVS processor 15 the family identifier and a value of the usable data length. This information enables MVS processor 15 to determine whether the track contains CKD data or SCSI data. MVS processor 15 expects a particular maximum usable data length for a particular family of storage subsystem. If the usable data length is less than or equal to the maximum expected value, then MVS processor 15 concludes that the track contains CKD data. If the usable data length is greater than the maximum expected value, then MVS processor 15 concludes that the track contains SCSI data.

Accordingly, based on the value of the usable data length, MVS processor 15 determines whether the data unit is in CKD format or SCSI format, and prepares to receive the track, in CKD format or SCSI format, having the indicated usable data length. For example, MVS processor 15 may allocate a buffer to accommodate the track based on the usable data length.

Subsequently, MVS processor 15 dispatches a command for data storage subsystem 30 to forward the track of data to MVS processor 15. Data storage subsystem 30 responds by sending the track to MVS processor 15. EHD 25 distinguishes a track of SCSI data from a track of CKD data based on the usable data length of the track, as described above. If the track contains SCSI data, then EHD 25 appends a header to the track to enable MVS processor 15 to process the track. The header includes a home address, a record 0, and a count field in accordance with MVS protocol. MVS processor 15 receives the track, in either the first format or the second format, having the usable data length reported by storage subsystem 30.

Figure 2:
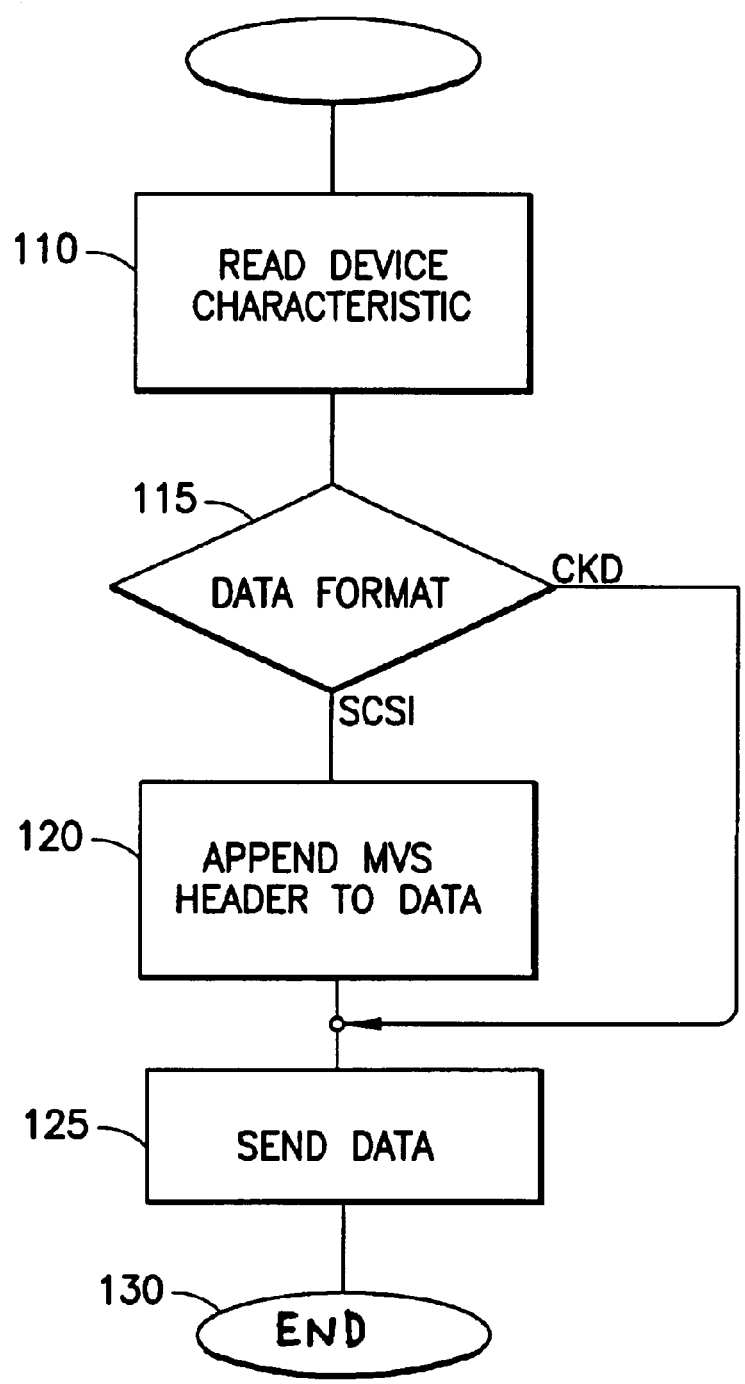
FIG. 2 is a flowchart of a method for causing a data unit that is formatted in a SCSI format to take a CKD format in accordance with the present invention.

FIG. 2 is a flowchart of a method for enabling a computer that processes data formatted in a first format to read a data unit that is formatted in a second format from a storage subsystem that is capable of storing data in either the first format or the second format in accordance with the present invention. This method is implemented in a system such as that shown in FIG. 1 and described above. For the purpose of illustration herein, the first format is CKD and the second format is SCSI. While the procedures required to execute the invention hereof are indicated as already loaded into MVS processor 15 and data storage subsystem 30, respectively, they may be configured on a storage media, such as data memory 13 in FIG. 1, for subsequent loading into these components.

MVS processor 15 wishes to read a track of data from data storage subsystem 30. The method begins with step 110.

In step 110, MVS processor 15 dispatches a Read Device Characteristic Command to data storage subsystem 30. Data storage subsystem 30 responds by sending a report that includes a usable data length of the track. The method then advances to step 115.

In step 115, based on the usable data length, both MVS processor 15 and data storage subsystem 30 determine whether the track contains SCSI data or CKD data. If the track contains CKD data, then the method branches to step 125. If the track contains SCSI data then the method advances to step 120.

In step 120, MVS processor 15 prepares to receive the track, in either CKD format or SCSI format, having the usable data length reported by storage subsystem 30 in step 110. Also, storage subsystem 30, via EHD 25, appends a header to the track. The header includes a home address, a record 0, and a count field in accordance with MVS protocol. The method then advances to step 125.

In step 125, MVS processor 15 dispatches a command for data storage subsystem 30 to forward the track. In response, data storage subsystem 30 sends the track of data to MVS processor 15. MVS processor 15 receives the track, in either CKD format or SCSI format, having the usable data length reported by storage subsystem 30 in step 110. The method then advances to step 130.

In step 130, the method ends.

It should be understood that the foregoing description is only illustrative of the invention. Various alternatives and modifications can be devised by those skilled in the art without departing from the invention. For example, the present invention is not limited to an open system and an MVS system, or to SCSI and CKD data formats, but can be applied in any case where the data formats can be distinguished on a basis of usable data length. Accordingly, the present invention is intended to embrace all such alternatives, modifications and variances that fall within the scope of the appended claims.

What is claimed is:

1. A method for enabling a computer that processes data formatted in a first format to read a data unit that is formatted in a second format from a storage subsystem that is capable of storing data in either said first format or said second format, said method comprising:

dispatching, from said computer to said storage subsystem, a command for said storage subsystem to report a data length of said data unit;

sending, from said storage subsystem to said computer, a value of said data length;

based on the value of the data length that is received at the computer, determining whether said data unit is in said first format or in said second format and preparing for receipt of said data unit, in said first format or said second format, having said data length;

dispatching, from said computer to said storage subsystem, a command for said storage subsystem to forward said data unit to said computer; and sending said data unit from said storage subsystem to said computer.

2. The method of claim 1, wherein said first format is a count, key and data (CKD) format and said second format is a small computer standard interface (SCSI) format.

3. The method of claim 1, wherein said computer backs up said data unit in accordance with a multiple virtual storage (MVS) backup procedure.

4. A method for enabling a computer that processes data formatted in a first format to read a data unit that is formatted in a second format from a storage subsystem that is capable of storing data in either said first format or said second format, said method comprising:

dispatching, from said computer to said storage subsystem, a command for said storage subsystem to report a data length of said data unit;

sending, from said storage subsystem to said computer, a value of said data length that enables said computer to determine whether said data unit is in said first format or in said second format and prepare for receipt of said data unit having said data length;

dispatching, from said computer to said storage subsystem, a command for said storage subsystem to forward said data unit to said computer; and sending said data unit from said storage subsystem to said computer;

wherein said storage subsystem includes a logical cylinder 0 that is reserved for administrative data that is used by said computer, and wherein said method further comprises, before dispatching, bypassing said cylinder 0 when writing data in said second format to said storage subsystem.

5. The method of claim 4, wherein said administrative data is a volume label and a volume table of contents in accordance with a multiple virtual storage (MVS) storage protocol.

6. A method for enabling a computer that processes data formatted in a first format to read a data unit that is formatted in a second format from a storage subsystem that is capable of storing data in either said first format or said second format, said method comprising:

dispatching, from said computer to said storage subsystem, a command for said storage subsystem to report a data length of said data unit;

sending, from said storage subsystem to said computer, a value of said data length that enables said computer to determine whether said data unit is in said first format or in said second format and prepare for receipt of said data unit having said data length;

dispatching, from said computer to said storage subsystem, a command for said storage subsystem to forward said data unit to said computer; and sending said data unit from said storage subsystem to said computer;

further comprising, before sending said data unit from said storage system to said computer, appending, by said storage subsystem, a header to said data unit to enable said computer to process said data unit when said data unit is in said second format.

7. The method of claim 6, wherein said header includes a home address, a record 0, and a count field in accordance with a multiple virtual storage (MVS) storage protocol.

8. A system in which a computer that processes data formatted in a first format is enabled to read data formatted in a second format from a storage subsystem that is capable of storing data in either said first format or said second format, comprising:

a computer including:

means for dispatching a command for said storage subsystem to report a data length of a data unit;

means for determining whether said data unit is in said first format or said second format based on said data length;

means for receiving said data unit, in said first format or said second format, having said data length, means for dispatching a command for said storage subsystem to forward said data unit to said computer; and a storage subsystem including:

means for sending a value of said data length to said computer; and means for sending said data unit to said computer.

9. The system of claim 8, wherein said first format is a count, key and data (CKD) format and said second format is a small computer standard interface (SCSI) format.

10. The system of claim 8, wherein said computer backs up said data unit in accordance with a multiple virtual storage (MVS) backup procedure.

11. A system in which a computer that processes data formatted in a first format is enabled to read data formatted in a second format from a storage subsystem that is capable of storing data in either said first format or said second format, comprising:

a computer including:

means for dispatching a command for said storable subsystem to report a data length of said data unit;

means for determining whether said data unit is in said first format or said second format based on said data length;

means for receiving said data unit, in said first format or said second format, having said data length, means for dispatching a command for said storage subsystem to forward said data unit to said computer; and a storage subsystem including:
  means for sending a value of said data length to said computer; and
  means for sending said data unit to said computer;
  wherein said storage subsystem includes a logical cylinder 0 that is reserved for administrative data that is used by said computer, and
  wherein said storage subsystem bypasses said cylinder 0 when writing data in said second format to said storage subsystem.

12. The system of claim 11, wherein said administrative data is a volume label and a volume table of contents in accordance with a multiple virtual storage (MVS) storage protocol.

13. A system in which a computer that processes data formatted in a first format is enabled to read data formatted in a second format from a storage subsystem that is capable of storing data in either said first format or said second format, comprising:
  a computer including:
    means for dispatching a command for said storage subsystem to report a data length of said data unit;
    means for determining whether said data unit is in said first format or said second format based on said data length;
    means for receiving said data unit, in said first format or said second format, having said data length,
    means for dispatching a command for said storage subsystem to forward said data unit to said computer; and
  a storage subsystem including:
    means for sending a value of said data length to said computer; and
    means for sending said data unit to said computer;
    wherein said storage subsystem appends a header to said data unit to enable said computer to process said data unit when said data unit is in said second format.

14. A storage media that includes instructions for controlling a system in which a computer that processes data formatted in a first format is enabled to read a data unit that is formatted in a second format from a storage subsystem that is capable of storing data in either said first format or said second format, said storage media comprising:
  instructions to control said computer to dispatch to said storage subsystem a command for said storage subsystem to report a data length of said data unit;
  instructions to control said storage subsystem to send to said computer a value of said data length;
  instructions, responsive to the value of the data length that is received at the computer, to determine whether said data unit is in said first format or in said second format and to prepare for receipt of said data unit, in said first format or said second format, having said data length;
  instructions to control said computer to dispatch to said storage subsystem a command for said storage subsystem to forward said data unit to said computer; and
  instructions to control said storage subsystem to send said data unit to said computer.

15. The storage media of claim 14, wherein said first format is a count, key and data (CKD) format and said second format is a small computer standard interface (SCSI) format.

16. The storage media of claim 14, wherein said computer backs up said data unit in accordance with a multiple virtual storage (MVS) backup procedure.

17. A storage media that includes instructions for controlling a system in which a computer that processes data formatted in a first format is enabled to read a data unit that is formatted in a second format from a storage subsystem that is capable of storing data in either said first format or said second format, said storage media comprising:
  (a) means for controlling said computer to dispatch to said storage subsystem a command for said storage subsystem to report a data length of said data unit;
  (b) means for controlling said storage subsystem to send to said computer a value of said data length that enables said computer to determine whether said data unit is in said first format or in said second format and prepare for receipt of said data unit, in said first format or said second format, having said data length;
  (c) means for controlling said computer to dispatch to said storage subsystem a command for said storage subsystem to forward said data unit to said computer; and
  (d) means for controlling said storage subsystem to send said data unit to said computer;
  wherein said storage subsystem includes a logical cylinder 0 that is reserved for administrative data that is used by said computer, and
  wherein said storage media further comprises means for controlling said storage subsystem to bypass said cylinder 0 when writing data in said second format to said storage subsystem.

18. The storage media of claim 17, wherein said administrative data is a volume label and a volume table of contents in accordance with a multiple virtual storage (MVS) storage protocol.

19. A storage media that includes instructions for controlling a system in which a computer that processes data formatted in a first format is enabled to read a data unit that is formatted in a second format from a storage subsystem that is capable of storing data in either said first format or said second format, said storage media comprising:
  (a) means for controlling said computer to dispatch to said storage subsystem a command for said storage subsystem to report a data length of said data unit;
  (b) means for controlling said storage subsystem to send to said computer a value of said data length that enables said computer to determine whether said data unit is in said first format or in said second format and prepare for receipt of said data unit, in said first format or said second format, having said data length;
  (c) means for controlling said computer to dispatch to said storage subsystem a command for said storage subsystem to forward said data unit to said computer; and
  (d) means for controlling said storage subsystem to send said data unit to said computer;
  further comprising means for controlling said storage subsystem to append a header to said data unit to enable said computer to process said data unit when said data unit is in said second format.

20. The storage media of claim 19, wherein said header includes a home address, a record 0, and a count field in accordance with a multiple virtual storage (MVS) storage protocol.

21. A system comprising a computer that processes data formatted in a first format and a storage subsystem capable of storing data in either said first format or a second format, said computer comprising circuitry that operates under control of a program to dispatch a command for said storage subsystem to report a data length of a stored data unit, to determine whether said data unit is in said first format or said second format based on the data length reported by said storage subsystem, to receive the data unit, in said first format or said second format, having the reported data length, and to dispatch a command for said storage subsystem to forward said data unit to said computer, said storage subsystem comprising circuitry for sending the value of the data length to said computer and to send said data unit to said computer.

22. The system of claim 21, where said first format is a count, key and data (CKD) format and said second format is a small computer standard interface (SCSI) format.

23. The system of claim 21, where said storage subsystem comprises a logical cylinder 0 that is reserved for administrative data that is used by said computer, and circuitry to bypass cylinder 0 when writing data in said second format.

24. The new system of claim 23, where said administrative data comprises a volume label and a volume table of contents in accordance with a multiple virtual storage (MVS) storage protocol.

25. The system of claim 21, where said storage subsystem appends a header to said data unit to enable said computer to process said data unit when said data unit is in said second format.

26. The new system of claim 21, where said computer backs up said data unit in accordance with a multiple virtual storage (MVS) backup procedure.

* * * * *

UNITED STATES PATENT AND TRADEMARK OFFICE
CERTIFICATE OF CORRECTION

PATENT NO. : 6,883,049 B1
DATED : April 19, 2005
INVENTOR(S) : Fuld et al.

It is certified that error appears in the above-identified patent and that said Letters Patent is hereby corrected as shown below:

Column 6,
Line 58, please delete "storable" and replace it with -- storage --.

Column 10,
Lines 3 and 11, please delete "new".

Signed and Sealed this

Fifth Day of July, 2005

JON W. DUDAS
*Director of the United States Patent and Trademark Office*